Feb. 13, 1951 A. R. CUNNINGHAM 2,541,210
WAGON CONSTRUCTION
Filed March 15, 1948 5 Sheets-Sheet 1
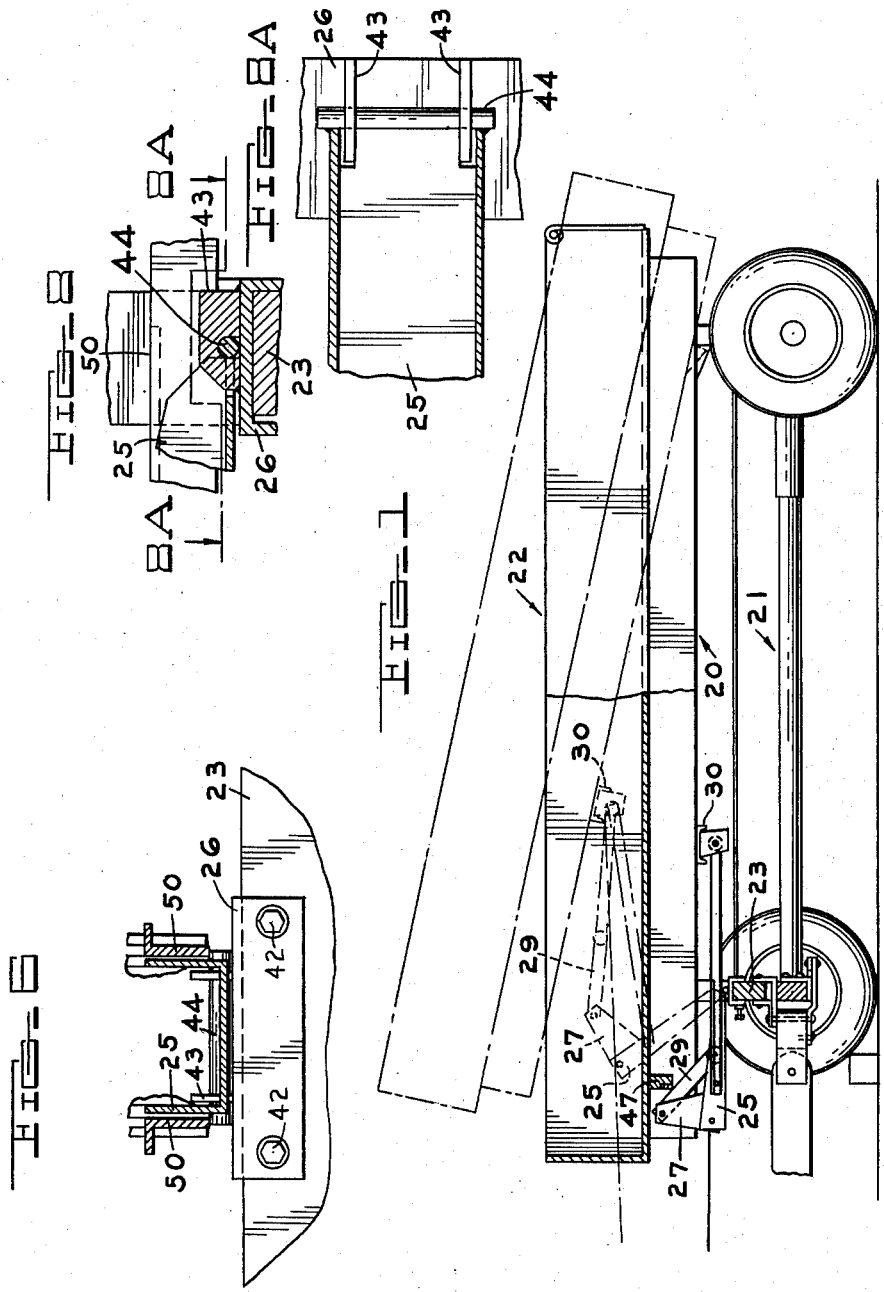
INVENTOR.
ARTHUR RAYMOND CUNNINGHAM
BY
Whittemore, Hulbert & Belknap
ATTORNEYS Feb. 13, 1951 A. R. CUNNINGHAM 2,541,210
WAGON CONSTRUCTION
Filed March 15, 1948 5 Sheets-Sheet 2
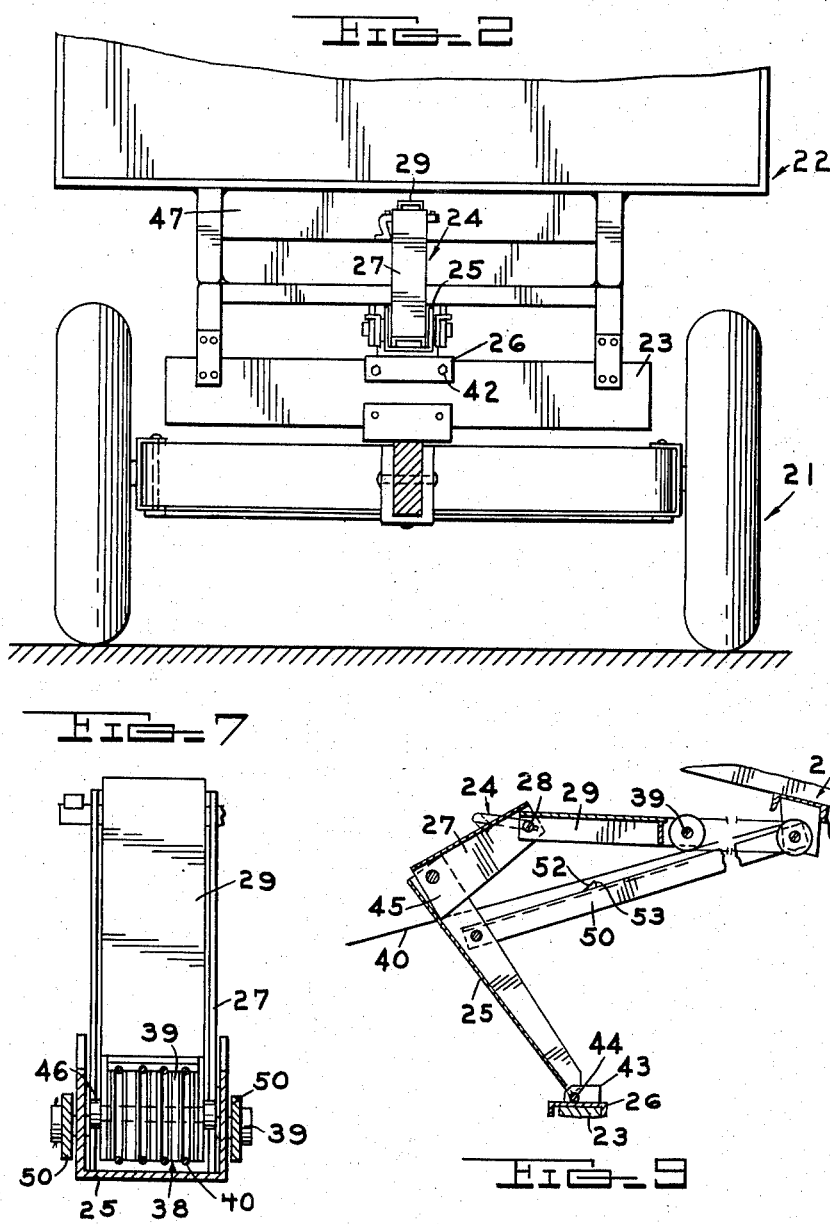
INVENTOR.
ARTHUR RAYMOND CUNNINGHAM
BY
ATTORNEYS Feb. 13, 1951 — A. R. CUNNINGHAM — 2,541,210
WAGON CONSTRUCTION
Filed March 15, 1948 — 5 Sheets-Sheet 3
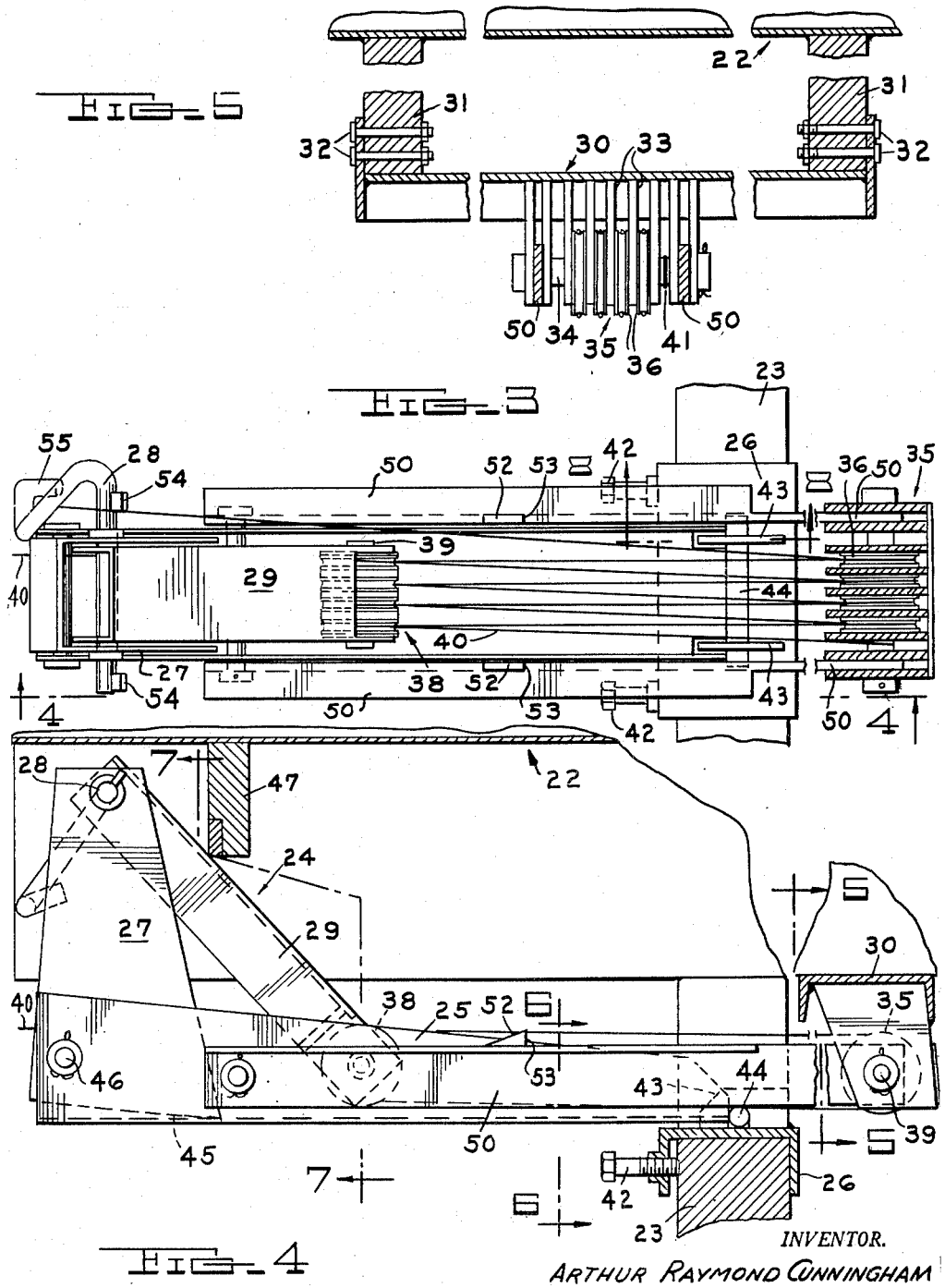
INVENTOR.
ARTHUR RAYMOND CUNNINGHAM
BY
Whittemore Hulbert & Belknap
ATTORNEYS

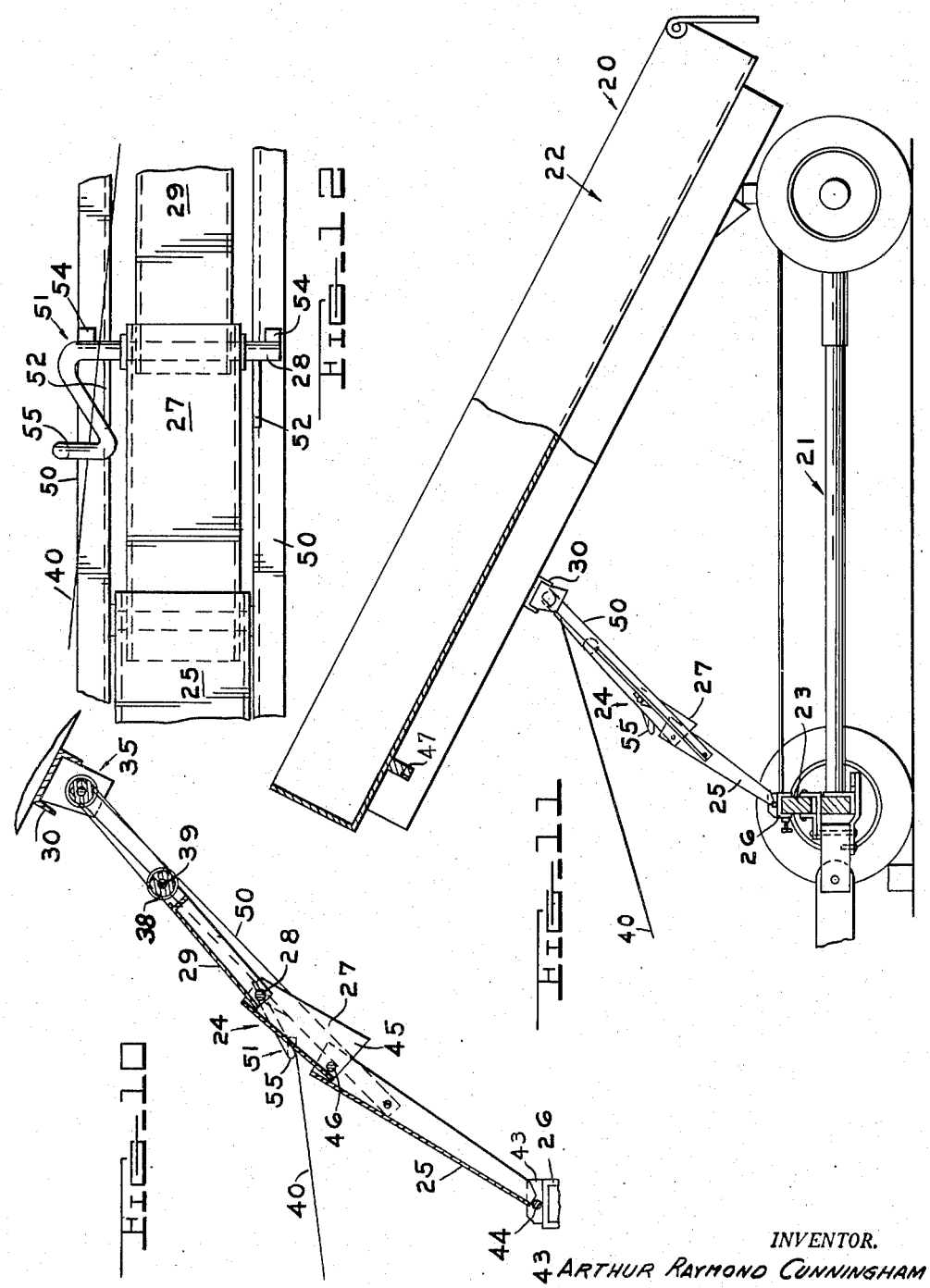

Feb. 13, 1951          A. R. CUNNINGHAM          2,541,210
WAGON CONSTRUCTION
Filed March 15, 1948                              5 Sheets-Sheet 5
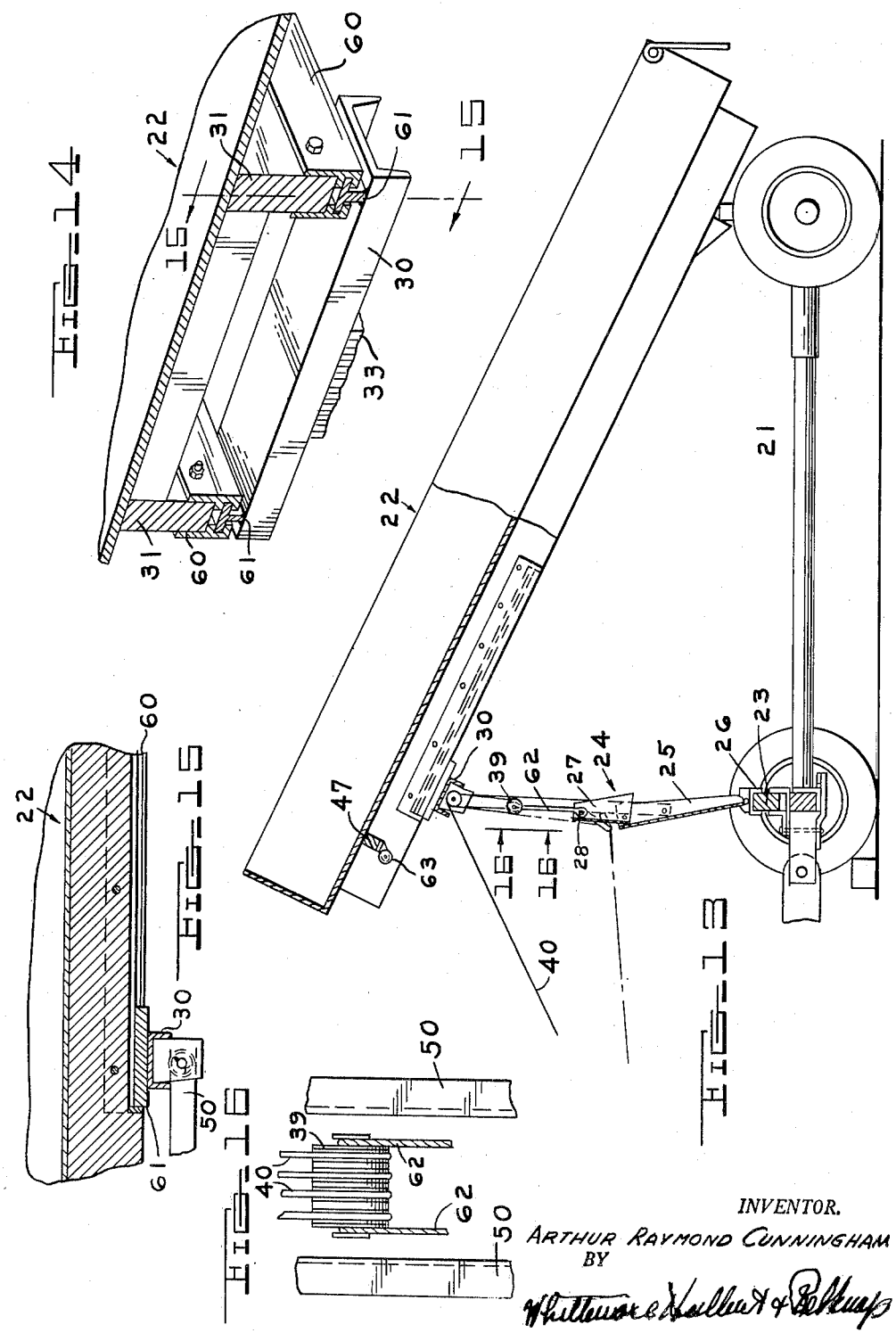
INVENTOR.
ARTHUR RAYMOND CUNNINGHAM
BY
ATTORNEYS Patented Feb. 13, 1951

2,541,210

UNITED STATES PATENT OFFICE 2,541,210

WAGON CONSTRUCTION

Arthur Raymond Cunningham, Detroit, Mich.

Application March 15, 1948, Serial No. 14,835

12 Claims. (Cl. 298—19)

This invention relates to wagon structures and refers more particularly to improvements in farm type wagons having a body supported for tilting movement.

One of the objects of this invention is to provide a wagon having relatively simple means for connecting one end of the body to the chassis enabling raising of the body relative to the chassis to a position which permits removal of the load in the body by the action of gravity.

Another object of this invention is to provide a construction wherein the connection between the body and chassis comprises collapsible linkage of a design which enables the same to be readily extended to effect movement of the body to its unloading position.

Still another object of this invention is to provide collapsible linkage designed to enable the use of a conventional tractor or some equivalent power means for operating the linkage to move the same to an extended position wherein the body is tilted at such an angle that the load is readily dispensed by the action of gravity.

A still further object of this invention is to provide a construction of the type set forth above wherein the collapsible linkage forms an assembly capable of being readily installed on different types of orthodox wagon constructions.

Still another feature of this invention is to provide relatively simple latch means responsive to movement of the collapsible linkage to an extended position to hold the linkage in the latter position, and capable of being readily released when desired.

The foregoing as well as other objects will be made more apparent as this description proceeds, especially when considered in connection with the accompanying drawings, wherein:

Figure 1 is a side elevational view partly in section of a wagon construction embodying the features of this invention;

Figure 2 is an elevational view of the front end of the wagon shown in Figure 1;

Figure 3 is a fragmentary plan view partly in section of the collapsible linkage employed for tilting the body of the wagon;

Figure 4 is a sectional view taken on the line 4—4 of Figure 3;

Figures 5, 6 and 7 are respectively cross sectional views taken on the lines 5—5, 6—6 and 7—7 of Figure 4;

Figure 8 is a sectional view taken on the line 8—8 of Figure 3;

Figure 8A is a sectional view taken on the line 8A—8A of Figure 8;

Figure 9 is a sectional view of the collapsible linkage showing the latter in an intermediate extended position;

Figure 10 is a view similar to Figure 9 showing the linkage in a fully extended position;

Figure 11 is a side elevational view partly in section showing the body of the wagon in the tilted position it assumes when the linkage is extended;

Figure 12 is a fragmentary plan view of the latch mechanism employed for holding the linkage in an extended position;

Figure 13 is a side elevational view partly in section of a modified construction;

Figure 14 is a perspective view partly in section of a portion of the wagon structure shown in Figure 13;

Figure 15 is a sectional view taken on the line 15—15 of Figure 14; and

Figure 16 is a fragmentary sectional view taken on the line 16—16 of Figure 13.

Referring first to the embodiment of the invention shown in Figures 1 to 12 inclusive, it will be noted that the reference numeral 20 designates a farm type wagon comprising a chassis 21 and a body 22. The body 22 may be of any suitable construction and is supported at the rear end of the chassis in a manner to enable the front end of the body to be swung upwardly relative to the chassis 21 to the position indicated in Figure 11 of the drawings.

The chassis 21 is provided at the front end thereof with a transversely extending bolster part 23, and this part is connected to the underside of the body at a point spaced rearwardly from the front end thereof by a lifting device indicated generally by the numeral 24. The lifting device 24 comprises collapsible linkage designed to form an assembly capable of being installed as a unit on the wagon. In detail the collapsible linkage includes an upwardly opening channel-shaped end link 25 having the rear end pivoted to a bracket 26, which in turn is attachable to the bolster part 23. The free end of the link 25 is pivotally connected to the adjacent end of a rearwardly opening channel-shaped intermediate link 27 having the opposite end pivotally connected by a pin 28 to the front end of a second end link 29. The free end of the link 29 is connected to a bracket 30, which in turn is secured to the underside of the body 22 at a point spaced rearwardly from the front end of the body. The construction is such that the device 24 may be installed as a unit by merely securing the brackets 26 and 30 to the chassis and body respectively.

Upon reference to Figure 5 of the drawings, it will be noted that the bracket 30 comprises a rail which extends transversely of the body and is removably secured at opposite ends to the sills 31 of the body by fastener elements 32. Secured to the bracket 30 intermediate the ends of the rail is a plurality of laterally spaced plates 33 having aligned openings therethrough for receiving a shaft 34. Mounted upon the shaft 34 is a pulley 35 comprising a plurality of sections 36 respectively positioned between adjacent plates 33.

As shown particularly in Figures 3, 4 and 7 of the drawings, a pulley 38 is rotatably supported on a pin 39 extending transversely of the free end of the link 29 and journalled on the latter. The pulley 38 is formed of sections corresponding in number to the sections 36 of the pulley 35, and is adapted to assume a position within the channel of the link 25 when the linkage of the device 24 is in a collapsed position.

The two pulleys are connected together by means of a flexible cable 40 reeved around the respective pulley sections in the manner clearly indicated in Figure 3 of the drawings, and having one end 41 secured to the pin 34. The free end portion of the cable is extended forwardly and may be attached to a suitable tractor or other power pulling device to operate the linkage.

It has been stated above that the bracket 26 is attachable to the bolster part 23. This bracket is channel-shaped in cross section, and is adapted to receive the top portion of the bolster as shown particularly in Figures 4 and 8. The bracket is removably clamped to the bolster by suitable studs 42 threadably mounted on the front flange of the bracket. Referring now more particularly to Figures 8 and 8A, it will be noted that a pair of plates 43 are secured to the top of the bracket 26 in lateral spaced relationship and cooperate with the bracket to form an opening for receiving a pivot pin 44. The adjacent end of the link 25 is suitably slotted to receive the plates 43, the plates being welded or otherwise permanently secured to the pivot pin 44. Inasmuch as the bracket 26 is removably clamped to the bolster part 23 by the studs 42, and since the bracket 30 is removably secured to the body by the fastener elements 32, it follows that the linkage 24 may be readily attached to or removed from the wagon as a unit.

The collapsible linkage 24 is shown in the inoperative or collapsed position in Figure 4 of the drawings. As shown in Figure 4 of the drawings, the intermediate link 27 extends upwardly from the free end of the end link 25 at substantially right angles to the latter and is located in this position by engagement of a lateral extension 45 on the link 27 with the base of the channel-shaped end link 25 at a point between the pivot 44 and the pivot 46, which serves to connect the free end of the link 25 to the link 27. The link 29 assumes the inclined position indicated in Figure 4 wherein the free end or pulley 38 nests within the channel of the link 25 in a position spaced a substantial distance forwardly from the pulley 35. It will further be seen from Figure 4 of the drawings that an abutment 47 is secured to the underside of the body in a position to engage the top of the link 29 intermediate the ends of the latter when the linkage 24 is in a collapsed position. With this construction it will be understood that a pull applied to the free end of the cable 40 tends to move the pulley 38 toward the pulley 35, and in so doing, swings the link 29 upwardly about the pin 28. The link 27 is prevented from swinging rearwardly by engagement of the extension 45 thereon with the link rearwardly of the pivot 46. As a result an upward thrust is applied to the front end portion of the body through the abutment 47. This thrust is sufficient to start the swinging movement of the forward end of the body upwardly.

When the link 29 approaches a position in alignment with the two pulleys, continued operation of the cable 40 imparts an upward swinging movement to the link 25. This movement is transmitted to the body by a pair of links 50 respectively located at opposite sides of the link 25 and having the front end portions pivoted to the link 25 intermediate the ends of the latter. The rear ends of the links 50 are pivoted on the pin 34 with the result that the link 25 is rigidly connected to the bracket 30 on the body. Thus as the linkage 24 is operated by the cable 40 to the extended position thereof shown in Figure 10, the body 22 is tilted to the position shown in Figure 11, where any load thereon is dispensed from the rear end of the body by the action of gravity.

The linkage 24 is held in the extended position thereof by suitable latch means 51 shown particularly in Figure 12 of the drawings. In the present instance the pivot pin 28 forms a part of the latch and opposite ends of the pin 28 are adapted to overlie the links 50 in the extended position of the linkage 24. The links 50 are formed with upstanding projections 52 having cam surfaces engageable with opposite ends of the pin, as the linkage 24 approaches its extended position, and are also formed with abrupt shoulders 53 for engagement with the opposite ends of the pin 28 in the extended position of the linkage to form a stop preventing return movement of the linkage to the collapsed position thereof. It will further be noted from Figures 3 and 12 that suitable lugs 54 are respectively formed on opposite ends of the pin 28 in positions to engage the top surfaces of the links 50. The arrangement is such that rocking movement of the pin in a clockwise direction engages the lugs 54 with the respective links 50 and raises the pin 28 sufficiently to release the same from the shoulders 53 on the projections 52. When the pin 28 is in its raised position, the linkage of course, may be collapsed by merely releasing the pulling force on the cable 40.

In addition to the foregoing it will be noted from both Figures 3 and 12 that one end of the pin 28 is bent laterally, and is formed with a hook 55. The arrangement is such that when it is desired to collapse the linkage 24, the operator merely loops the cable 40 around the hook 55 and applies a pull on the cable sufficient to rock the pin 28 throughout the angular distance necessary to release the same from the projections 52.

Referring now to the embodiment of the invention shown in Figures 13 to 16 inclusive, it will be noted that one of the principal differences between this modification and the one described above is that the bracket 30 is slidably supported on the body in a manner to enable the linkage 24 to assume a substantially vertical position when extended. Such a construction increases the angle of tilting of the body 22 relative to the chassis for a given length of linkage and reduces the tendency of the weight of the body to collapse the linkage. As shown particularly in Figures 14 and 15, it will be noted that a pair of guides 60 are respectively secured to the bottom edges of the sill members 31, and fittings 61 are welded or otherwise permanently secured to the top of the bracket rail 30 in positions to respectively slidably engage the tracks 60. In the collapsed position of the linkage, the bracket 30 is located at the rear end of the guides 60, and is moved forwardly of the guide to the position shown in Figure 13 of the drawings during manipulation of the cable 40 to extend the linkage.

A further difference between the construction shown in Figures 13 to 16 inclusive and the first embodiment of the invention consists in substituting flexible cables 62 for the pivoted link 29. The cables 62 actually cooperate to form a link in that opposite ends of the cables are respectively pivotally anchored to the pins 39 and 28. The cables are respectively engaged by grooved rollers 63 supported on the abutment 47 for rotation. This construction of course reduces wear of either the cables or abutment during operation of the lifting mechanism. The remaining structure of the embodiment shown in Figures 13 to 16 inclusive may be identical to the first described form of the invention, and the same reference characters are employed to indicate corresponding parts.

It will be understood from the foregoing that both embodiments of this invention provide a lifting devive of the collapsible linkage type capable of being readily installed on farm wagons of conventional construction. It will further be noted that the linkage is so designed as to enable the wagon body to be raised to its unloading position by the use of a towing vehicle or some other form of power means.

What I claim as my invention is:

1. A wagon structure comprising a chassis, a body supported on the chassis for tilting movement and having an anchor bracket, means connecting the body to the chassis including collapsible linkage having end links and having the free end of one end link pivoted to the chassis, means for moving the free end of the other end link toward the body anchor bracket to extend the linkage, and means for tilting the body relative to the chassis in response to movement of the free end of said other link toward said bracket.

2. A wagon structure comprising a chassis, a body supported on the chassis for tilting movement and having an anchor bracket, means connecting the body to the chassis including collapsible linkage having end links and having the free end of one end link pivoted to the chassis, means connecting the free end of the other end link to the body bracket including a flexible linear member operable to move the free end of said other end link toward the body bracket, and a link having one end pivoted to the first end link and having the oppostie end pivoted to the body.

3. A wagon structure comprising a chassis, a body supported on the chassis for tilting movement and having an anchor bracket, means connecting the body to the chassis including collapsible linkage having end links and having the free end of one end link pivoted to the chassis, a connection between the free end of the other end link and the body bracket permitting movement of the free end of the said other link toward and away from the anchor bracket, an intermediate link having the opposite ends respectively pivotally connected to the adjacent ends of the end links and responsive to initial movement of the free end of said other link toward the anchor bracket to impart an upward thrust on the body, and a rigid link having the opposite ends respectively pivotally connected to the first end link and body bracket for continuing the upward thrust on the body as movement of the free end of said other end link continues.

4. A wagon structure comprising a chassis, a body supported on the chassis for tilting movement, means for tilting the body relative to the chassis including collapsible linkage having end links and having the free end of one end link pivoted to the chassis, a pulley supported at the free end of the other end link for rotation, a second pulley supported on the body for rotation, a flexible linear member anchored at one end relative to one of the pulleys and reeved around said pulleys, whereby a pull applied to the free end of the member moves the free end of said other link in a direction to extend the collapsible linkage, and a link having the opposite ends respectively pivotally connected to the body and to the first named end link intermediate the ends thereof.

5. A wagon structure comprising a chassis, a body supported on the chassis for tilting movement, means for tilting the body relative to the chassis including collapsible linkage having end links and having the free end of one end link pivoted to the chassis, an intermediate link having the opposite ends respectively pivotally connected to the adjacent ends of the end links, a pulley supported on the other end link adjacent the free end thereof for rotation, a second pulley supported on the body for rotation, a flexible linear member having one end anchored relative to one of the pulleys and reeved around said pulleys, whereby a pull applied to the free end of said flexible linear member moves the free end of said other link in a direction to extend the linkage, means on the body cooperating with the said other end link to apply an initial upward thrust on the body in response to initial movement of the linkage to the extended positions thereof, and a rigid link having one end pivoted to the body and having the opposite end pivoted to the first named end link intermediate the ends thereof to continue applying an upward force on the body as movement of the linkage to the extended position is continued.

6. A wagon structure comprising a chassis, a body supported on the chassis for tilting movement and having an anchor part, collapsible linkage connecting the body to the chassis, said linkage including an end link pivoted at one end to the chassis, an intermediate link pivoted at one end to the free end of said end link and extending generally perpendicular to the end link in the collapsed position of the linkage, means on the pivoted end of the intermediate link engageable with the end link between the ends of the latter to locate the intermediate link in the position aforesaid thereof, a second end link pivoted at one end to the other end of the intermediate link and having the free end spaced from the anchor part, a connection between the free end of the second end link and the anchor part on the body for moving the free end of the second end link toward the anchor part and thereby move the linkage to an extended position, and means responsive to movement of the linkage to the extended position thereof to impart a tilting movement to said body.

7. A wagon structure comprising a chassis, a body supported on the chassis for tilting movement and having an anchor part, collapsible linkage connecting the body to the chassis, said linkage including an end link pivoted at one end to the chassis, an intermediate link pivoted at one end to the free end of said end link and extending generally perpendicular to the end link in the collapsed position of the linkage, means on the pivoted end of the intermediate link engageable with the end link between the ends of the latter to locate the intermediate link in the position aforesaid thereof, a second end link pivoted at one end to the other end of the intermediate link and having the free end spaced from the bracket, a connection between the free end of the second end link and the anchor part on the body for moving the free end of the second end link toward the anchor part and thereby move the linkage to an extended position, means on the body positioned to be engaged by the intermediate link upon initial movement of the linkage to an extended position to impart an upward thrust to the body, and a rigid link having the opposite ends respectively pivoted to the anchorage part and first end link intermediate the ends thereof.

8. A wagon structure comprising a chassis, a body supported on the chassis for tilting movement, means connecting the body to the chassis including collapsible linkage having first and second end links and having the free end of the first end link pivoted to the chassis, an anchorage part supported on the body in a position spaced longitudinally of the body from the pivotal connection between the chassis and first end link and slidable to a position in substantial vertical alignment with the latter pivotal connection, a connection between the anchorage part and the free end of the second end link operable to relatively move the anchorage part and free end of the second end link toward one another, and means extending the collapsible linkage in response to relative movement of the anchorage part and free end of the second end link toward one another.

9. A wagon structure comprising a chassis, a body supported on the chassis for tilting movement and having an anchor part, collapsible linkage connecting the body to the chassis, said linkage including an end link pivoted at one end to the chassis, an intermediate link pivoted at one end to the free end of said end link and extending generally perpendicular to the end link in the collapsed position of the linkage, means on the pivoted end of the intermediate link engageable with the end link between the ends of the latter to locate the intermediate link in the position aforesaid thereof, a second end link pivoted at one end to the other end of the intermediate link and having the free end spaced from the bracket, pulleys respectively rotatably mounted on the anchorage part and free end of the second link, a flexible linear member having one end anchored with respect to one pulley and reeved around said pulleys whereby a pull applied to the free end of the member moves the free end of the second link toward the anchorage part to extend said linkage, and means operated by the linkage as the latter is extended to tilt the body relative to the chassis.

10. A wagon structure comprising a chassis, a body supported on the chassis for tilting movement, means for tilting the body relative to the chassis including collapsible linkage between the body and chassis, said linkage including a first link having one end pivotally supported on the chassis, a second link having one end pivoted to the free end of the first link, a flexible link having one end pivoted to the other end of the second link, a connection between the free end of the second link and body operable to move the links to their extended positions, means positioned on the body for engagement with the flexible link intermediate the ends thereof upon initial movement of the linkage to an extended position to impart an upward thrust to the body, and means connecting the first link and body responsive to continued movement of the links to their extended positions to continue tilting movement of the body relative to the chassis.

11. A wagon structure comprising a chassis, a body supported on the chassis for tilting movement, means for tilting the body relative to the chassis including collapsible linkage located between the body and chassis, said linkage including a first link pivotally supported at one end on the chassis, a second link pivotally connected adjacent one end to the free end portion of the first link, a third link having one end pivoted to the other end portion of the second link, a connection between the free end portion of the second link and body operable to move the links from their collapsed positions to their extended positions, means responsive to movement of the links to their extended positions to tilt the body relative to the chassis, and releasable latch means for holding the links in their extended positions.

12. A wagon structure comprising a chassis, a body supported on the chassis for tilting movement, means for tilting the body relative to the chassis including collapsible linkage between the body and chassis, said linkage including a first link having one end pivotally supported on the chassis, a second link having one end pivoted to the free end of the first link, a flexible link having one end pivoted to the other end of the second link, a connection between the free end of the second link and body operable to move the links to their extended positions, means connecting the first link and body responsive to movement of the links to their extended positions to tilt the body relative to the chassis, and releasable latch means responsive to movement of the links to their extended positions to hold the links in the latter positions.

ARTHUR RAYMOND CUNNINGHAM.

REFERENCES CITED

The following references are of record in the file of this patent:

UNITED STATES PATENTS

| Number | Name | Date |
|---|---|---|
| 939,782 | Wright | Nov. 9, 1909 |
| 1,237,323 | Gervais | Aug. 21, 1917 |
| 1,284,779 | Rodenhausen | Nov. 12, 1918 |
| 1,636,555 | Engler | July 19, 1927 |
| 2,425,953 | Rogers | Aug. 19, 1947 |

FOREIGN PATENTS

| Number | Country | Date |
|---|---|---|
| 130,813 | Switzerland | of 1928 |